Feb. 19, 1929.
H. P. GORMAN
1,703,032
SOAP PASTE DISPENSER
Filed Feb. 24, 1927
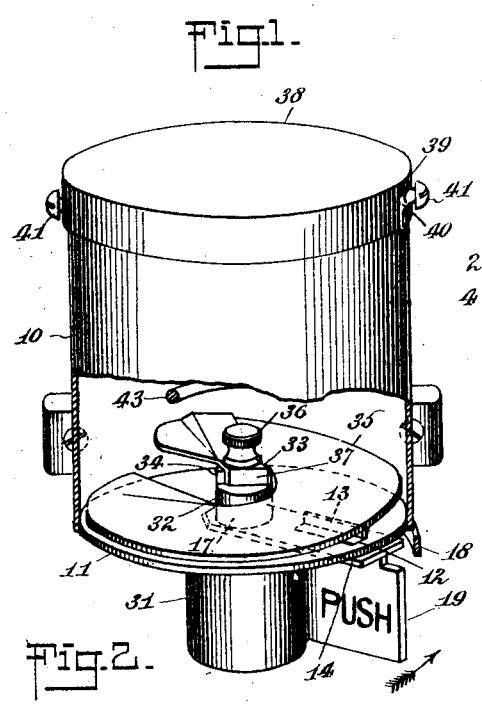
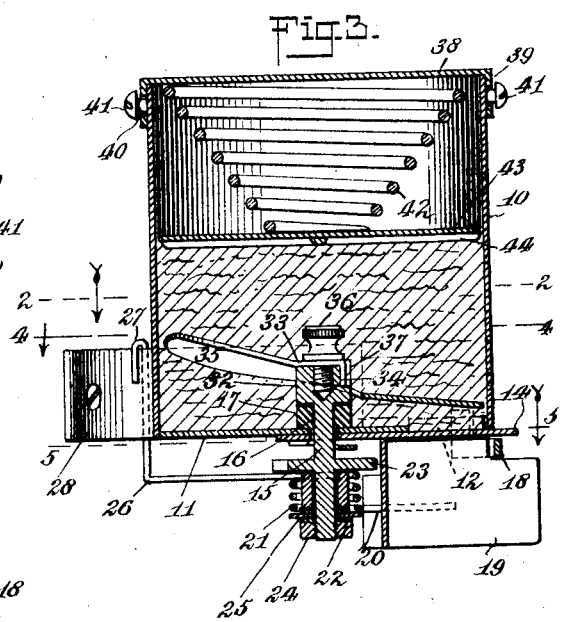
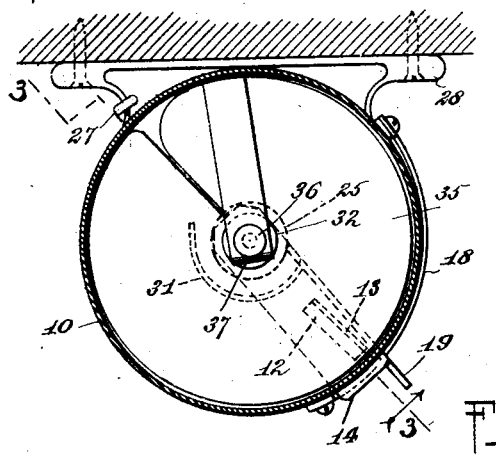
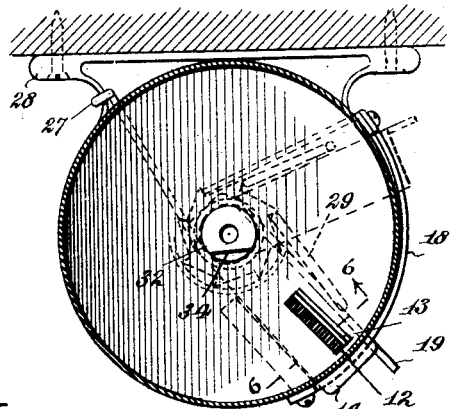
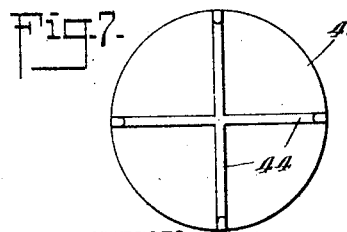
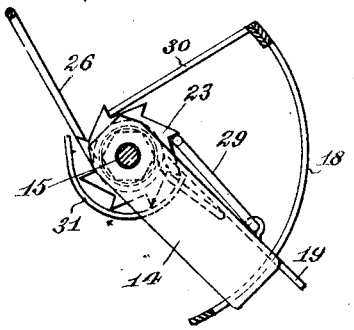
INVENTOR
*Horace P. Gorman*
BY
ATTORNEY Patented Feb. 19, 1929.

1,703,032

UNITED STATES PATENT OFFICE.

HORACE P. GORMAN, OF RYE, NEW YORK.

SOAP-PASTE DISPENSER.

Application filed February 24, 1927. Serial No. 170,594.

This invention relates to dispensing devices and has particular reference to a dispensing container for a material or substance in paste form, and especially for use in dispensing soap paste.

One of the principal objects and advantages of the present invention is to provide an improved dispensing container having a manually operable discharge mechanism which may be manipulated to dispense varying quantities of the contents according to the desires of the users.

More specifically the invention comprehends an improved dispensing container for pasty substances which includes means operable by and with the discharge mechanism for exerting a pressure upon the contents to effect a positive discharge of the same and which means serves to effect a complete discharge of the contents.

The invention further contemplates a dispensing container which constitutes a convenient, sanitary and economical medium for using the soap paste or other substance dispensed thereby.

Other objects reside in the simplicity of construction and mode of operation, the the economy with which the same may be produced, and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of the dispensing container with parts broken away and shown in section to disclose the underlying structure;

Fig. 2 is a horizontal sectional view therethrough taken approximately on the line 2—2 of Fig. 3;

Fig. 3 is a vertical sectional view therethrough taken approximately on the line 3—3 of Fig. 2;

Fig. 4 is a horizontal sectional view taken approximately on the line 4—4 of Fig. 3;

Fig. 5 is a similar view taken approximately on the line 5—5 of Fig. 3;

Fig. 6 is a fragmentary vertical sectional view taken approximately on the line 6—6 of Fig. 4;

Fig. 7 is a detail bottom plan view of the follower member.

Referring to the drawings by characters of reference, 10 designates the body of the dispensing container, which is of substantially cylindrical formation and is provided with a closed bottom 11 having an outlet port 12 formed with an upwardly projecting inclined lip 13 at one of its edges. A valve plate 14 is mounted on the under side of the bottom wall for rotatory movement and is fulcrumed upon a shaft 15 which is journaled for turning movement in a bearing opening 16 extending axially through the bottom wall and through an upwardly projecting boss 17 formed on the bottom wall. The outer end of the valve plate 14 projects slightly beyond the periphery of the receptacle body 10 and is guided and limited in its swinging movement by a substantially U-shaped arcuate bar 18 attached to the receptacle body and depending from the bottom thereof. The valve plate is provided with a right-angularly disposed depending portion 19 constituting a manipulating handle and the terminal 20 of a spring engages with said handle for normally swinging the valve plate to the limit of its movement in one direction where it covers and closes the discharge opening or outlet 12. The spring is preferably in the nature of a resilient wire having a coiled portion 21 the convolutions of which are coiled about a sleeve 22 mounted on the shaft 15 between a ratchet 23 secured to the shaft an a nut 24 threaded on the lower end of the shaft, washers 25 being interposed between the nut and the sleeve. The remaining terminal 26 of the spring is formed with a hooked extremity 27 which is engaged with the supporting bracket 28 for mounting the receptacle body 10 upon a supporting surface. The handle 12 carries a pawl 29 engageable with the teeth of the ratchet for turning the shaft incident with the movement of the valve plate from its normally closed position to an open position. A stationary pawl 30 is supported from the container body and engages the ratchet teeth for preventing retrograde movement of the shaft 15 when the handle 19 and valve plate are moved from an open to a closed position by the spring. The handle 19 is formed with or covers a substantially semicircular guard 31 which partially surrounds, houses and projects the ratchet, pawls, shaft and spring. The upper portion of the shaft 15 which is disposed within the receptacle body 10, is formed with an enlarged head 32 having a threaded bore 33 and a rabbeted portion 34. A substantially helical or spiral feeding blade 35 is detachably connected with the shaft head 32 by means of a set screw 36, the threaded shank of which extends through an opening in the blade and is anchored in the threaded bore 33 of the shaft head. The blade 35 is provided with an angularly disposed lug 37 which fits in the rabbeted portion 34 to key or lock the blade to the shaft head for turning movement therewith. The upper end of the receptacle body 10 is closed by a cover or lid 38 having a marginal flange 39 which fits over the upper open end of the receptacle body and is detachably connected therewith by bayonet slot and pin connections 40 and 41. The cover or lid 38 has attached to its under side the upper end of a coiled expansion spring 42, the lower end of which spring has connected therewith a follower plate 43 on the under side of which follower plate radial ribs 44 are provided.

In use and operation, the soap paste or other substance S is normally forced downwardly within the receptacle body 10 by the follower plate 43 and dispensing of the contents is effected by manipulating the handle 19 by pushing and swinging the same in the direction indicated by the arrow in Fig. 1. This movement of the handle moves the valve plate 14 in a direction to uncover the discharge opening 12 against the action of the spring terminal 20; simultaneously the shaft 15 is rotated in the same direction by the engagement of the pawl 29 with the teeth of the ratchet 23 and causes the spiral feeder blade to be turned to set up a feeding action upon the contents S in addition to the constant feeding pressure exerted thereon by the follower plate. It will thus be seen that a quantity of the contents S will be forced outwardly through the discharge opening 12, the inclined lip 13 assisting in directing the substance through the discharge opening. When pressure by the fingers is removed from the handle 19, the return movement of the valve plate will cut off the discharged quantity and cause the same to drop on to the fingers of the operator, while the valve plate effectually closes the outlet or discharge opening 12.

During the return movement of the handle and valve plate to a closed position under the action of the spring 20, it is obvious that the pawl 30 locks the shaft and blade 35 against retrograde movement while the pawl 29 carried by the handle freely ratchets over the ratchet teeth. In some instances where a full quantity or maximum charge is not desired, the handle and valve plate may be swung only partially to the extent of its stroke and allowed to return, in which instance the next operation will require the full or a greater stroke in order to effect turning movement of the blade 35.

When the contents are depleted to such an extent that the follower plate advances into contact with the upper edge of the blade 35, turning of the blade will cause an engagement with the ribs 44 and will signal to the user that the supply of the contents should be replenished although the remaining quantity of the contents may be fully discharged without detrimental effects upon the mechanism.

It will be noted that washers including a split spring washer are interposed between the ratchet 23 and the apertured inner end of the valve plate 14, for the purpose of forcing and maintaining the valve plate in flat contact with the lower surface of the bottom wall 11. It will be further noted that one of the washers 25 interposed between the sleeve 22 and the nut 24, is of sufficient diameter whereby its peripheral edge bears against the handle 12 to maintain the same in a position so that binding on the handle is prevented upon movement of the same to its return position by the spring.

What is claimed is:

1. A dispensing device including a container having a discharge outlet provided with an internal deflecting lip, a valve element normally covering the discharge outlet and movable relatively thereto for opening the same, a rotary spiral feeding element within the container, and means operable by and with the valve element upon movement to an open position for turning said element in a direction to effect a positive feeding of the contents toward the outlet and deflecting lip and the discharge of a predetermined quantity of said contents through the discharge outlet.

2. A dispensing device including a container having a discharge outlet, a valve element normally covering the discharge outlet and movable relative thereto for opening the same, a rotary spiral feeding element within the container, and means operable by and with the valve element upon movement to an open position for turning said element to effect the movement of the contents trapped under the element toward and through the discharge outlet.

3. A dispensing container for paste substances, said container having a discharge opening in its bottom wall, a movable closure for said discharge opening, and a helical blade movable by and with the closure upon movement to an open position for exerting a pressure upon and bodily moving the contents trapped under the blade toward the discharge opening for extruding a predetermined quantity therethrough.

4. A dispensing container, said container having a discharge opening in its bottom wall, a removable top wall for said container, a spring-pressed follower carried by said top wall for exerting a pressure upon the contents of the container, a movable closure for said discharge opening, and a helical blade in the lower portion of the container movable by and with the closure upon movement to an open position for feeding the contents through the discharge opening whereby to effect the discharge of a quantity of said contents therethrough.

5. A dispensing container, said container having a discharge opening in its bottom wall, a removable top wall for said container, a spring-pressed follower carried by said top wall for exerting a pressure upon the contents of the container, a movable closure for said discharge opening, and a helical blade in the lower portion of the container movable by and with the closure upon movement to an open position for feeding the contents through the discharge opening whereby to effect the discharge of a quantity of said contents therethrough, the said discharge opening having a projecting lip assisting in directing the discharge of the quantities of contents therethrough.

HORACE P. GORMAN.